June 10, 1941.  C. FIELD  2,245,103
METHOD AND APPARATUS FOR MANUFACTURING ICE MAKING APPARATUS
Filed July 13, 1937
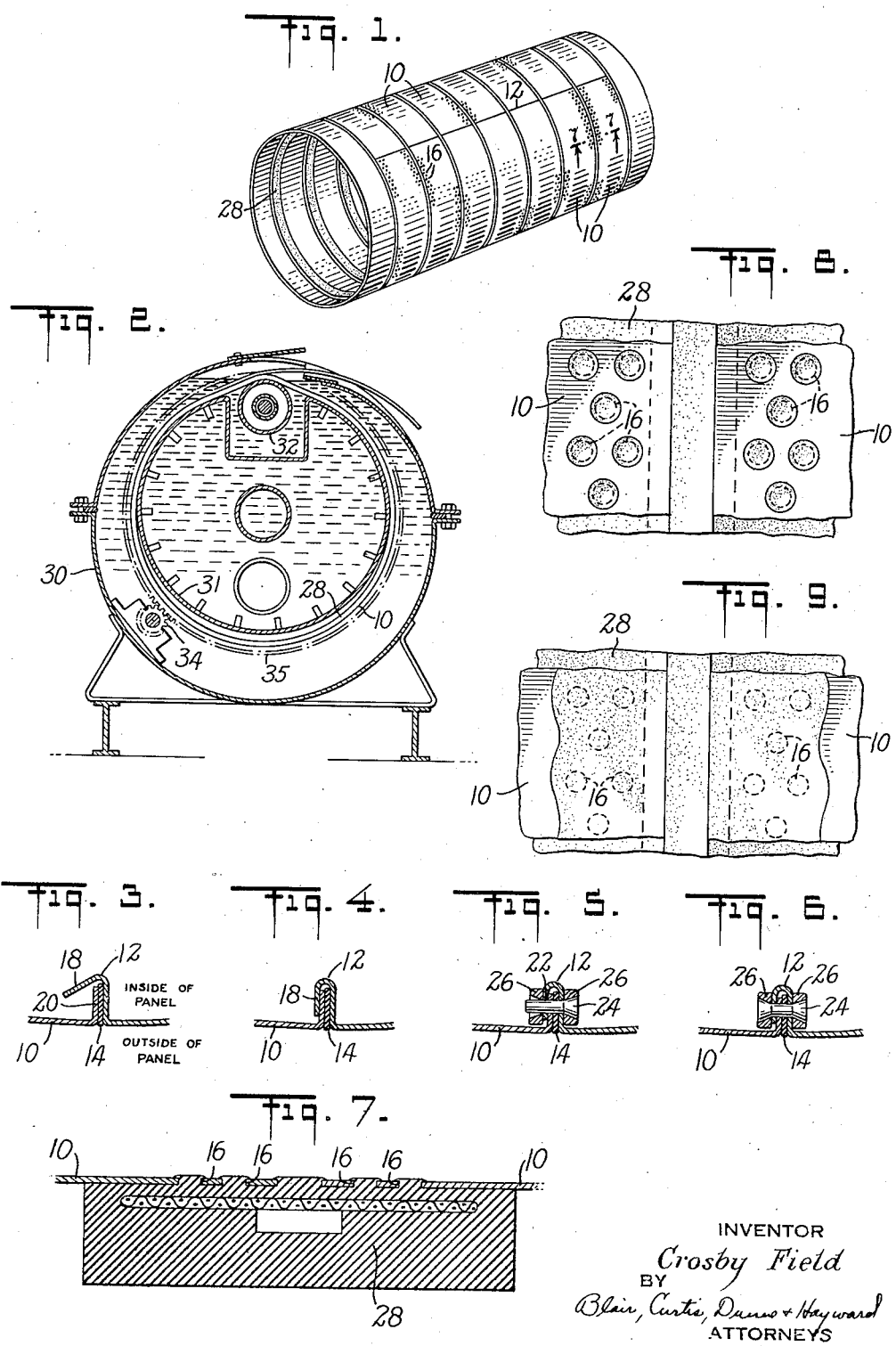
INVENTOR
Crosby Field
BY
Blair, Curtis, Dunn & Hayward
ATTORNEYS Patented June 10, 1941

2,245,103

UNITED STATES PATENT OFFICE 2,245,103

METHOD AND APPARATUS FOR MANUFACTURING ICE MAKING APPARATUS

Crosby Field, Brooklyn, N. Y., assignor to Flakice Corporation, Brooklyn, N. Y., a corporation of Delaware Application July 13, 1937, Serial No. 153,347

19 Claims. (Cl. 62—1)

This invention relates to apparatus for solidifying liquids, as by freezing, and to the method of manufacturing such apparatus.

In my Patent 2,078,938, issued May 4, 1937 is disclosed a flexible cylinder for an ice-making machine, the cylinder being fabricated from a plurality of cylindrical metal panels flexibly joined together. The present invention is an improvement on the cylinder and on the method of manufacturing it.

Such a cylinder, when used, for example, for freezing ice, is constantly rotated in a bath of water about a horizontal axis and is continuously flexed as it passes over the top of a deflecting roller extending above the water level. A refrigerating medium, such as brine, is supplied to the inside surface of the cylinder, causing ice to form on the outside surface. The ice continuously peels from the cylinder along the line of flexing.

Although the panels of a cylinder such as above described are preferably made of Monel metal, which is normally resistant to corrosion, the Monel metal is susceptible to corrosion under some conditions of water being frozen. Likewise the inside surface of the panels may be corroded by the brine if its pH value is changed from one that does not corrode Monel metal. These corrosive difficulties have in some instances interfered with the efficiency of the machine and so are disadvantageous.

Another problem arising in the fabrication of such cylinders is that of joining the metal panels. The panels are joined by flexible rubber strips vulcanized to juxtaposed edge portions of adjacent panels. Circular rubber bands are cemented to the vulcanized strips inside the cylinder and serve to support the cylinder and to flex it as it passes over the flexing and supporting roller. The flexing produced by passing the cylinder over such a roll causes several types of stresses on the cylinder (and particularly between the metal panels and the joining rubber connections) which tend to separate the rubber from the metal, particularly if the cylinder is left idle for an appreciable length of time.

In the present invention the cylinder and the method of making it have been improved to improve the efficiency of the cylinder and its resistance to wear.

Fig. 1 is a perspective view of a finished cylinder;

Fig. 2 is a cross section of ice-making apparatus in which such a finished cylinder is used;

Figs. 3 through 6 are sections taken through the abutting ends of a panel showing the method of joining the ends;

Fig. 7 is a section on line 7—7 of Fig. 1 and shows in detail a so-called rubber rivet formed during the process of joining the panels;

Fig. 8 is a detail view of the outside of the flexible connection between the panels; and, Fig. 9 is a detail view similar to Fig. 8 but showing a modified construction.

Corresponding reference characters refer to corresponding parts throughout the several views of the drawing.

A cylinder embodying the present invention comprises a plurality of cylindrical metal panels 10 flexibly joined. Each panel is preferably made from a metal, such as Monel metal, which has the necessary physical requirements to withstand the continuous flexing. If the panel is fabricated from a metal strip, the ends of the strip are joined together by a suitable hook seam 12, such as shown in Figs. 3 through 6. Between the contacting surfaces of the portions joined in the hook seam is a thin layer of rubber 14 which aids in sealing the seam against leakage and protecting it against corrosion. The panels are also preferably plated on the outside surface with a corrosion-resistant metal giving a hard finish, such as chromium or nickel. Further, each panel around its edge portions is perforated as shown in Figs. 7 and 8 at 16, and the inside edge portions of each panel are burred as with the cutting edges of a tap drawn along the inside edge portions of the panel.

These panels are joined by suitable flexible material, such for example as by rubber strips, vulcanized to edge portions of the panels, the rubber protruding through the perforations 16 during the vulcanizing step to form what might be termed rubber rivets such as shown in Fig. 7 or rubber strips and rivets as shown in Fig. 9. The exposed inside surface of each panel of the cylinder is coated with a thin layer of rubber, or other flexible coating, which is substantially continuous and which prevents the brine from corroding the panel in the event of the pH value changing from that desired. This coating is so thin that it has little effect on the coefficient of heat transfer of the panels.

Referring to Figure 2, there is shown icemaking apparatus in which such a cylinder is used. The cylinder is partially immersed in water in a tank 30 and is hung over an upper deflecting or supporting roller 32 and over a side stationary drum support 31. Refrigerating brine is supplied to and taken from the inside of the cylinder through the conduits shown, as described in the above-mentioned patent. The cylinder is continuously rotated by means of driving pinions 34, only one of which is shown, meshing with gears 35 secured to the outside of non-flexible parts of the cylinder.

Such a cylinder may be fabricated by the following procedure.

Strips of Monel metal are first cut to the proper length and are perforated, as shown at 16 in Figures 1, 7 and 8, along their edge portions. Each panel is then rolled to a diameter slightly less than one-half the diameter of the finished panel as described in the above-mentioned patent.

The side of the strip on which the ice is to be frozen (the outside in the present embodiment) is chromium or nickel-plated by known methods.

After sanding both ends of the strips, one end of each strip is bent to form a partial hook as shown at 18 in Figure 3, and the other end is bent in at right angles as shown at 20 in Figure 3. The bent ends are then coated with rubber cement which is allowed to dry. They are then hooked together and placed in a seaming fixture, not shown, where they are clamped together as shown in Figure 4. They are bored with holes 22 for rivets 24 which lock the seam between clamping strips 26 when the heads of the rivets are expanded, as shown in Figures 5 and 6. After this riveting, the seam thus formed is heated and the rivets are again set, the heating being sufficient to permit the rubber coating between the contacting parts to flow.

The inside edge portions of each panel are now sanded and then burred, or provided with parallel circumferential ragged ridges, as by drawing the side cutting edges of a 12—24 tap along the edge portion of the panel while holding the tap approximately at right angles to the edge of the panel.

The parallel ragged ridges around the edge portion provide an improved bonding surface for the joining rubber strips subsequently vulcanized to the edge portions.

Around the inside edge portions of each panel is now applied several coats of rubber cement ("Vulcalock"), each coat being allowed to dry before the next succeeding coat is applied. After this operation a strip of metal foil (for example aluminum foil) is placed around each edge portion overlapping slightly the rubber cement coated portions of the panel and the adjacent non-coated surfaces of the panel.

The panels thus prepared are now mounted side by side in spaced relationship in a suitable form, such as described in the above-mentioned patent. Cardboard strips are laid over the exposed inside surface of each panel extending over the aluminum foil and overlapping slightly the cemented areas adjacent the aluminum foil. A connecting strip of unvulcanized rubber is then placed over each pair of juxtaposed edge portions of adjacent panels, the rubber strip spanning the space between the juxtaposed edges and overlapping the cemented areas of the edge portions. Additional strips are placed over the lock seams.

Seam forms are placed over these unvulcanized rubber strips, and the whole form is inserted into a vulcanizing chamber. An air bag is expanded inside the cylinder, as described in the above-mentioned patent, and the chamber is heated while the inside of the cylinder is subjected by means of the air bag to a pressure of about 3½ pounds per square inch above the pressure outside the cylinder.

The unvulcanized rubber is thus cured and during the curing operation the rubber flows through the perforations in the edge portions of the panels, and securely attaches itself to the burred surfaces of the panels. Enough unvulcanized rubber may be placed over the edge portions of the panels so that during the vulcanization process the rubber flows under pressure through the perforations, not only to form the rubber rivet but also to form a continuous strip along the outside edge portions of the panels, as shown in Fig. 9. As a result, the entire edge portion of each panel is embedded in rubber.

Cured rubber roller bands 28, which support the cylinder as it passes over the deflecting roller (Fig. 2) and over the stationary drum guide 31, are now cemented to the rubber connecting seams to form continuous resilient supporting bands around the cylinder.

The cardboard and foil used during the vulcanizing process is removed. The presence of the foil during the vulcanizing process gives the exposed edge of the cemented area around the edge portions of each panel a smooth attractive surface. The metal surfaces inside and out are then cleaned with a suitable cleansing agent and the inside exposed metal surfaces are sanded and a coat of diluted rubber cement is applied. This coating, after drying, leaves a thin rubber coating on the inside surfaces of the panels which, without disadvantageously interfering with the heat transfer efficiency of the panels, protects them from corrosion from the refrigerant.

A cylinder thus made withstands continuous flexing and corrosion. The perforations which allow the rubber rivets to form, materially assist in strengthening the connection between the rubber and the metal. Rubber apparently bonds better with sharp edges of the metal and the perforations produce artificial edges for the betterment of the bond. The ragged ridges produced by the tap around the edge portions also produce additional "edges" to aid in the bonding.

The rubber rivets formed in the perforations have a further function of reducing the so-called "drift" of the rubber which drift permits the rubber when under strain for a considerable time to assume a new shape. During the flexing of the cylinder the rubber is subjected to at least three kinds of stresses. As the roller bands 28 ride onto the deflecting roller, as described in the above-mentioned patent, both compression and shear are set up in the roller bands and all parts in contact therewith. As the roller bands leave the deflecting roller and approach the drum guides, tension on the roller bands and associated parts is produced. The rubber rivets aid in preventing these stresses from damaging the bond between the metal panels and the connecting rubber strips.

The chromium or nickel surface on the ice-forming surface of the cylinder prevents the surface from becoming pitted or otherwise deteriorating, and enables the cylinder to peal thinner strips of ice as the cylinder ages, than would be possible with a plain Monel metal surface.

I claim:

1. A flexible heat transfer member comprising a plurality of metal panels joined by connecting rubber strips, a thin rubber coating provided over the exposed metal surfaces of one side of the member to protect it against deterioration produced by a corrosive substance, and each panel being coated with a corrosion-resistant metal on the other surface thereof.

2. The method of bonding rubber to metal to form a joint therebetween adapted to withstand compressive and tensile stresses comprising, forming perforations in the metal over the area to be bonded, vulcanizing raw rubber to one side of the metal thus prepared, and causing the rubber to flow during vulcanization through the perforations and over the other side of the metal to form a continuous strip.

3. The method of flexibly joining a plurality of metal panels for an ice-making machine to form a joint therebetween adapted to withstand compressive and tensile stresses comprising, perforating the edge portions of the panels and forming further bonding edges on the edge portions, coating the edge portions thus prepared with cement and raw rubber strips, and vulcanizing the raw rubber causing it to flow through the perforations and around the edges.

4. Method of flexibly joining a plurality of metal panels for an ice-making machine to form a joint therebetween adapted to withstand compressive and tensile stresses comprising, perforating the edge portions of the panels and forming further bonding edges on the edge portions, coating the edge portions thus prepared with cement and raw rubber strips, vulcanizing the raw rubber causing it to flow through the perforations and around the edges, and applying a thin rubber coating over the exposed metal surface of one side of the panels.

5. The method of flexibly joining a plurality of metal panels for an ice-making machine to form a joint therebetween adapted to withstand compressive and tensile stresses comprising, arranging the panels in side-by-side spaced relationship, coating the edge portions with rubber cement and with raw rubber, applying strips of aluminum foil to the areas of cement coating not covered by the raw rubber, subsequently vulcanizing and subjecting the cement coating and the raw rubber to pressure to cause the raw rubber to flow through preformed holes in the edge portions of the panels and subsequently removing the foil and applying a thin rubber coating to the exposed metal inside the surfaces of the panels.

6. In heat exchange apparatus, a flexible heat exchange member comprising, a plurality of metal panels arranged side by side, and a non-metal flexible resilient means bonded to and connecting adjacent edge portions of said panels to join them and form a liquid-tight seam therebetween, each of said adjacent edge portions having holes formed therein, and said flexible resilient connecting means having integral projections thereon locking with the side walls of the holes in the adjacent edge portions to interlock said panels and connecting means.

7. In heat exchange apparatus, a flexible heat exchange member comprising, a plurality of thin metal panels arranged side by side, and a non-metal flexible resilient means bonded to and connecting adjacent edge portions of said panels to join them and form a liquid-tight seam therebetween, each of said adjacent edge portions having holes therethrough, and said flexible resilient means having integral projections thereon extending through said holes and peened thereover to interlock said panels and connecting means.

8. In heat exchange apparatus, a flexible heat exchange member comprising, a plurality of metal panels arranged side by side, and a rubber strip bonded to and connecting adjacent edge portions of said panels to join them, each of said adjacent edge portions having holes formed therein, and said rubber strip having a plurality of integral projections thereon which extend into and lock with said holes and the adjacent edge portions to interlock the panels and strips.

9. In heat exchange apparatus, a flexible heat exchange member comprising, a plurality of thin metal panels arranged side by side, and a rubber strip vulcanized to and connecting adjacent edge portions of said panels to join them, each of said adjacent edge portions having perforations therethrough, and said strip having integral rivet-like projections thereon extending through the perforations and being peened thereover to interlock said panel and strip.

10. The method of bonding a flexible rubber strip to an edge of a flexible metal panel to form a liquid-tight seam therebetween, comprising, perforating said panel within an attaching area extending along said edge and distorting said edge to form an upstanding ragged ridge therealong, placing aluminum foil upon one surface of said panel at the side of said attaching area, positioning said strip against said panel to cover said attaching area and extending beyond said edge, and vulcanizing said rubber strip and simultaneously causing it to flow through the perforations and around said edge into intimate contact with said upstanding ridge.

11. The method of bonding a flexible rubber strip to an edge of a flexible metal panel to form a liquid-tight seam therebetween, comprising, forming holes in said panel within an attaching area extending along said edge, placing a removable form upon one surface of said panel at the side of said attaching area, positioning said strip against said panel at the side of said form to cover said attaching area and extending beyond said edge, and vulcanizing said rubber strip and simultaneously causing it to flow into the holes.

12. In heat exchange apparatus, at least two thin metal panels arranged side by side; and rubber means bonded to and connecting adjacent edge portions of said panels to join them, each of said adjacent edge portions having holes therethrough, and each rubber means having a central joining portion and split side portions, each split side portion including two flaps holding therebetween the respective panel edge portion, and said flaps being bonded together by connecting portions integral therewith, and extending through the said holes.

13. In heat exchange apparatus, two panels arranged side by side with attaching areas extending along their adjacent edges, said panels having holes therein throughout their attaching areas; and a rubber strip bonded to and connecting said panels at said attaching areas; said rubber strip comprising, two sheet portions which extend on the two sides of said panels and cover said attaching areas, a central portion connecting said two sheets and positioned between said adjacent edges, and connecting portions extending through said holes.

14. In heat exchange apparatus, in combination, a plurality of metal panels arranged side by side, the edges of said panels having raised ragged ridges extending therealong, a non-metallic flexible resilient means secured to and connecting said adjacent edge portions of said panels forming a liquid-tight seal therebetween, each of said adjacent edge portions having holes formed therein, and said flexible resilient means having been forced under pressure into and set in said holes and gripping to said ragged edges.

15. In heat exchange apparatus, in combination, a flexible heat exchange member comprising a plurality of metal panels arranged side by side, and a non-metallic flexible resilient means bonded to and connecting adjacent edge portions of said panels to join them and form a liquid-tight seam therebetween, each of said adjacent edge portions having holes formed therein, said flexible resilient connecting means having integral projections thereon extending into said holes in the adjacent edge portions to interlock said panels and said connecting means, and a thin rubber coating covering the exposed metal surfaces on one side of said panels to protect them against deterioration produced by a corrosive substance.

16. In heat exchange apparatus, in combination, a flexible heat exchange member comprising a plurality of metal panels arranged side by side, and a non-metallic flexible resilient means bonded to and connecting adjacent edge portions of said panels to join them and form a liquid-tight seam therebetween, each of said adjacent edge portions having holes formed therein, said flexible resilient connecting means having integral projections thereon extending into said holes in the adjacent edge portions to interlock said panels and said connecting means, a thin rubber coating covering the exposed metal surfaces of one side of the panels to protect them against deterioration produced by a corrosive substance, and the other sides of said panels being coated with a corrosion-resistant metal.

17. In heat exchange apparatus, in combination, a flexible heat exchange member comprising a plurality of metal panels arranged side by side, and a non-metallic flexible resilient means bonded to and connecting adjacent edge portions of said panels to join them and form a liquid-tight seam therebetween, each of said adjacent edge portions having holes formed therein, said flexible resilient connecting means having integral projections thereon extending into said holes in the adjacent edge portions to interlock said panels and said connecting means, and the exposed metal surfaces on one side of said panels being coated with a corrosion-resistant metal.

18. The method of fabricating a cylindrical panel for a flexible heat exchange cylinder comprising: perforating the edge portions of a metal strip, operating on said strip to cause it to assume a substantially cylindrical shape with portions thereof overlapping and to tend to remain in such condition, plating said strip with non-corrodible metal, bending the edges of said overlapping portions, coating at least one of said edges with rubber cement, expanding the cylinder thus formed to bring said edges into juxtaposition, and clamping the bent edges together first while cold and then applying an additional clamping action while heated.

19. The method of fabricating a cylindrical panel for a flexible heat exchange cylinder comprising: perforating the edge portions of a metal strip, operating on said strip to cause it to assume a substantially cylindrical shape with portions thereof overlapping and to tend to remain in such condition, plating the outside of said strip with chromium, coating each end of the strip with rubber cement, expanding the cylinder thus formed to bring said ends into juxtaposition, clamping the ends together, and heating the seam thus formed and then repeating the clamping operation.

CROSBY FIELD.